(No Model.)
S. INGELS.
TILE SCOOP.
No. 264,295.   Patented Sept. 12, 1882.
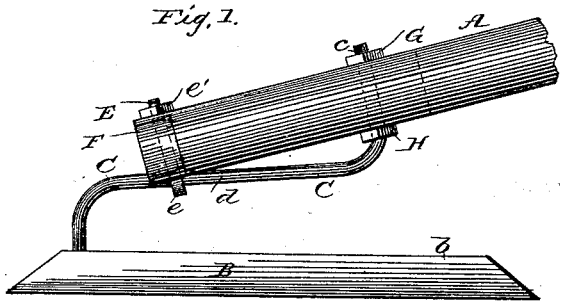
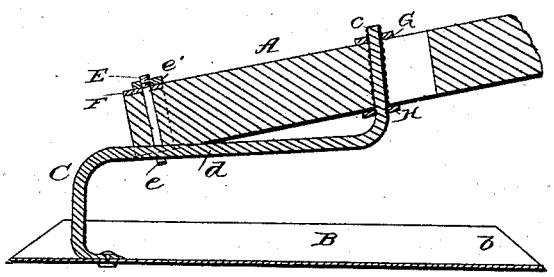
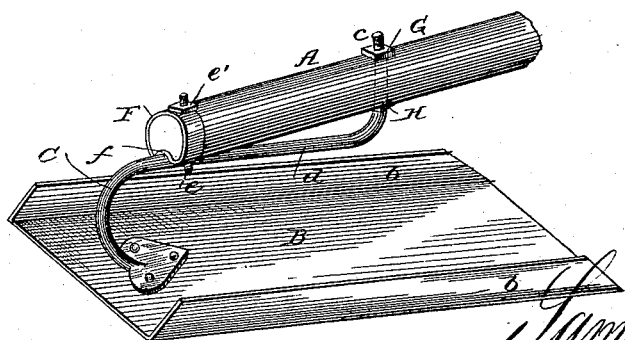
WITNESSES:
Fred. G. Dieterich.
Jno. W. Stockett.
Samuel Ingels,
INVENTOR.
by Louis Bagger & Co.
ATTORNEYS.

UNITED STATES PATENT OFFICE.

SAMUEL INGELS, OF HEMLOCK, INDIANA.

TILE-SCOOP.

SPECIFICATION forming part of Letters Patent No. 264,295, dated September 12, 1882.

Application filed July 18, 1882. (No model.)

*To all whom it may concern:*

Be it known that I, SAMUEL INGELS, of Hemlock, in the county of Howard and State of Indiana, have invented certain new and useful Improvements in Tile-Scoops; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved tile-scoop, with the handle broken off. Fig. 2 is a perspective rear view of the same; and Fig. 3 is a longitudinal sectional view of the scoop and handle.

Similar letters of reference indicate corresponding parts in all the figures.

My invention has relation to that class of implements known as "tile-scoops," which are used for cleaning out and leveling the bottom of tile-ditches. In this class of implements, as heretofore constructed, the scoop has the neck or shank welded or secured solidly to a sleeve or shoe which fits on the end of the handle. This construction necessitates the bending of the neck to give more or less slant to the scoop, thus making the neck liable to break after repeated bendings; and the object of my improvement is to so attach the scoop to the handle that its position may be adjusted or its pitch regulated without bending the neck.

In the accompanying drawings, the letter A represents part of the handle, and B the scoop, which is of the usual flat and rectangular form, with parallel side flanges, $b$ $b$.

C is the neck or shank, which is bent into the shape shown in the drawings, and screw-threaded at its upper straight part, $c$, where it passes through the handle. That part $d$ of the neck which is approximately parallel to the scoop is inserted through the eye $e$ of a bolt, E, which is nutted to the extreme end of the handle, the nut $e'$ bearing against a thimble or ferrule, F, the lower part of which is extended to form a lip or bearing, $f$, for the neck. The threaded part $c$ has two nuts, G and H, one above and one below the handle, and by adjusting these nuts it will be seen that the angle of the scoop relative to the handle may readily be changed. To facilitate this adjustment nut $e'$ should also be loosened, so as to bring the eye or fulcrum $e$ down a little distance below the handle, and after the scoop has been adjusted to its proper slant or pitch the several nuts are again tightened up.

Having thus described my invention, I claim and desire to secure by Letters Patent of the United States—

In a tile-scoop, the combination of the handle A, having thimble or ferrule F, scoop B, provided with a bent shank, C, having the threaded part $c$, eyebolt $e$ E, and nuts $e'$, G, and H, all constructed and combined, substantially as and for the purpose herein shown and described.

In testimony that I claim the foregoing as my own I have hereunto affixed my signature in presence of two witnesses.

SAMUEL INGELS.

Witnesses:
 NEWTON B. SMITH,
 JOHN INGELS.